US012502688B2

(12) United States Patent
Morris et al.

(10) Patent No.: US 12,502,688 B2
(45) Date of Patent: Dec. 23, 2025

(54) BINDING STRENGTH IMPROVEMENT IN LAMINATED CARPET TILES

(71) Applicant: ALADDIN MANUFACTURING CORPORATION, Calhoun, GA (US)

(72) Inventors: Harlan Morris, Calhoun, GA (US); Anthony Cascio, Calhoun, GA (US); Christopher M. Lonvick, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 99 days.

(21) Appl. No.: 18/636,526

(22) Filed: Apr. 16, 2024

(65) Prior Publication Data

US 2024/0424525 A1 Dec. 26, 2024

Related U.S. Application Data

(60) Provisional application No. 63/509,777, filed on Jun. 23, 2023.

(51) Int. Cl.
*B05D 1/28* (2006.01)
*B05D 1/40* (2006.01)
(Continued)

(52) U.S. Cl.
CPC ............... *B05D 1/28* (2013.01); *B05D 1/40* (2013.01); *B29C 65/4815* (2013.01);
(Continued)

(58) Field of Classification Search
CPC ... B05D 1/28; B05D 1/40; B05D 1/42; B05D 2508/00; B29C 65/10; B29C 65/103;
(Continued)

(56) References Cited

U.S. PATENT DOCUMENTS 5,916,393 A * 6/1999 Shaffer .................. B05D 5/10
156/298
11,084,267 B2 8/2021 Tichelaar et al.
(Continued)

OTHER PUBLICATIONS

Siriorn et al. "Viscosity improvement of recycled poly (ethylene terephthalate from waste bottles by adding antioxidants and chain-extender," EDP Sciences, E3S Web of Conferences, 302, 02019 (2021).

*Primary Examiner* — Michael A Tolin
(74) *Attorney, Agent, or Firm* — Meunier Carlin & Curfman LLC (57) ABSTRACT

Prior art teaches to apply strands of a hot melt adhesive on a primary backing of a textile product, such as a carpet or carpet tile, before adhering a secondary backing. In some cases, all portions of the strands may not contribute to the adhesion strength. Adjusting the viscosity of the hot melt adhesive may make the strands less flexible as they lay across the irregular features of the backstitching of a primary backing so they provide greater adhesion to the secondary backing. Alternatively, applying the hot melt adhesive to the secondary backing will also be used to create sufficient adhesion. Preferentially, using an air knife to prevent the strands from forming and/or to press the hot melt adhesive into the primary backing may also be used to create sufficient adhesion. These methods provide greater adhesion between the primary and secondary backings with less hot melt adhesive.

20 Claims, 3 Drawing Sheets

(51) Int. Cl.
 B29C 65/48 (2006.01)
 B29C 65/52 (2006.01)
 B32B 37/10 (2006.01)
 B32B 37/12 (2006.01)
 D06N 7/00 (2006.01)

(52) U.S. Cl.
 CPC ......... *B29C 65/526* (2013.01); *D06N 7/0078* (2013.01); *D06N 7/0081* (2013.01); *B05D 2508/00* (2013.01); *B32B 2037/1072* (2013.01); *B32B 2037/1215* (2013.01); *B32B 2262/0284* (2013.01); *B32B 2310/0454* (2013.01); *B32B 2471/02* (2013.01); *D06N 2203/061* (2013.01); *D06N 2213/02* (2013.01)

(58) Field of Classification Search
 CPC ... B29C 65/48; B29C 65/4805; B29C 65/481; B29C 65/4815; B29C 65/52; B29C 65/526; B32B 5/02; B32B 5/022; B32B 5/024; B32B 5/26; B32B 5/262; B32B 5/265; B32B 5/275; B32B 7/12; B32B 37/06; B32B 37/08; B32B 37/10; B32B 37/12; B32B 37/1207; B32B 37/1284; B32B 37/20; B32B 2037/1072; B32B 2037/1215; B32B 38/0036; B32B 2038/0048; B32B 2262/0276; B32B 2262/0284; B32B 2310/04; B32B 2310/0445; B32B 2310/0454; B32B 2310/0463; B32B 2310/0472; B32B 2419/04; D06N 7/0063; D06N 7/0071; D06N 7/0076; D06N 7/0078; D06N 7/0081; D06N 2203/061; D06N 2211/066; D06N 2213/02
 See application file for complete search history.

(56) References Cited

U.S. PATENT DOCUMENTS

2007/0209587 A1   9/2007   Kiener et al.
2020/0086344 A1*  3/2020   Rees .................. D06N 7/0097

* cited by examiner

BINDING STRENGTH IMPROVEMENT IN LAMINATED CARPET TILES

CROSS-REFERENCE TO RELATED APPLICATIONS

This application claims benefit of U.S. Provisional Patent Application No. 63/509,777, filed Jun. 23, 2023, the content of which is hereby incorporated by reference herein.

GENERAL FIELD OF THE INVENTION

The inventions disclosed and taught herein pertain to methods to produce laminated textile products. A laminated textile product comprises a primary backing, and a secondary backing adhered to the back surface of the primary backing. In many embodiments, the primary backing may be tufted with a yarn such that the yarn forms a pile on a first side of the primary backing and backstitches on a second side of the primary backing.

In some cases, the secondary backing may be a needled felt material, and may serve as a cushioning layer made of filaments that form a matrix. In these cases, the laminated textile product may not need a separate pad under the laminated textile product to provide a comfortable feel when walking upon the laminated textile product.

This specification discloses and teaches a method of applying an adhesive to either the primary or the secondary backing that provides greater adhesion between the primary and secondary backings than previously disclosed methods.

BACKGROUND

U.S. Pat. No. 11,084,267 B2 discloses: "The present invention pertains to a method to produce a laminated textile product, the product comprising a primary carrier sheet with yarns that form a pile on the front surface thereof, and a secondary carrier sheet adhered to the back surface of the primary carrier sheet, the method comprising providing a lick roller having a mass of molten polymer adhesive at its outer circumference, transporting the primary carrier sheet along the lick roller while its back surface is in contact with the outer circumference of the roller at a contact site, thereby transferring a layer of adhesive to the back surface of the primary carrier sheet, and bringing the secondary sheet in contact with the layer of adhesive to adhere the secondary sheet to the back surface of the primary carrier sheet to produce the laminated textile product, wherein downstream of the contact site between the primary carrier sheet and the lick roller, before the secondary sheet is contacted with the layer of adhesive, cobwebbing of the adhesive between the primary carrier sheet and the lick roller is induced."

U.S. Patent Publication No. 2007/0209587 A1 discloses: "The invention relates to an apparatus for coating at least one substrate web (19) or laminating at least one substrate web (22) onto a substrate web (19) that is coated with adhesives (21) so as to form a laminate (24). Said apparatus comprises a dosing device that is assigned to an application roller (16) used for applying adhesive (21) as well as a counterpressure roller (17) which is allocated to the application roller (16) and between which the at least one substrate web (19) is fed in order to apply the adhesive (21). The dosing device (14) is disposed so as to be movable relative to the application roller (16) in order to adjust a width of the dosing gap (28). The inventive apparatus is characterized in that the dosing device (14) encompasses at least two different areas (34, 37) which can be selectively assigned to a closing gap (28) in order to apply adhesive (21)."

The entire contents of the aforementioned patent and publication are incorporated by reference herein for all purposes.

A hot melt adhesive is a molten polymer adhesive in a state in which it can flow under the influence of gravity, as opposed to being in a solid state.

An applicator is any device that may apply a hot melt adhesive to a fabric such as a primary or secondary backing. In many cases this may be a roller where the roller contacts the hot melt adhesive and transfers the adhesive to the fabric. The amounts transferred may be controlled by the type and configuration of the roller and associated equipment.

In many embodiments, an applicator may be any transfer roller. This is where the transfer roller contacts the hot melt adhesive in a molten state and transfers the adhesive to the fabric.

For example, an applicator may be a lick roller where the lick roller rotates into a trough of the hot melt adhesive placed below the lick roller and picks up some of the adhesive. The fabric may be advanced across a portion of the lick roller to transfer some portion of the adhesive to the fabric.

In another embodiment, an applicator may be a kiss roller. A kiss roller may be configured to roll against a lick roller to pick up some of the adhesive, and then to roll against an advancing fabric to transfer a portion of the adhesive to the fabric.

In another embodiment, an applicator may be an application roller used in conjunction with a dosing roller. In this, a puddle of holt melt adhesive may be retained between the application roller and the dosing roller such that the application roller retains some of the adhesive as it rolls past a gap between the application roller and the dosing roller. This configuration offers a great deal of control of the amount of hot melt adhesive that is retained by the application roller since the level of the puddle and the gap between the rollers may be controlled. The advancing fabric may then roll across the application roller to transfer the adhesive to it.

In other embodiments, the applicator may be an extruder or other device that delivers melt blown filaments. The fluid propelling the filaments, such as hot air, may be configured to deliver strands, or filaments, that have desired lengths and cross-sections to a fabric.

Cob-webbing of an adhesive from an applicator means the formation of a continuously present row of multiple parallel strands of the adhesive along the length of the applicator. These fine strands or filaments, have a maximum typical diameter of between 1-5 mm, and a minimum typical diameter of around 1 μm, resembling the strands of a spider web. In particular, the strands will form a row of adjacent parallel strands having a length of at least 1 cm, up to about 20 cm in length.

In the embodiments where the applicator is some type of roller, the strands will extend perpendicular to the application roller and have a macroscopic length and width such that they are visible without magnification. In the embodiments where the applicator is some type of melt blown delivery, the strands will be blown in the direction of the propellant fluid and will lay down on the fabric substantially in the direction of flow of the propellant.

Carpets must meet certain testing criteria to be acceptable for sale and use by consumers. One of the testing criteria is that the primary and the secondary backings must not separate, or delaminate, under forces arranged to pull them apart. The testing for this is known as a delamination test and consists of measuring the force needed to overcome the adhesion to pull apart the primary and secondary backings, which are also known as the primary and secondary carrier sheets. A standard method to test the delamination strength of a carpet is ASTM-D3936. At the time of this writing, the most current version of this test methodology was published in January 2021. The specific test described herein may be referenced as ASTM-D3936-21.

Another test that carpet segments must pass is a resistance to pulling out a tuft. It would be unacceptable if the tufts of a pile of a carpet were to be pulled out by walking across the surface or by cleaning the carpet such as with a vacuum cleaner. Therefore, tests are performed to ensure that the tufts are properly secured to the carpet to resist normal stresses. A standard method to test the strength of the tuft binding is ASTM-D1335-21.

In many cases, the application of a sufficient amount of adhesive provides an acceptable result to a delamination test and tuft binding test. That is to say that the application of a large amount of the adhesive between the primary and secondary sheets will keep the two sheets secured together against a force to pull them apart and will keep the tufts bound to the carpet. However, if the amount of adhesive is large enough, then the carpet may exhibit a stiffness that is unattractive to consumers. This stiffness may be felt by a consumer walking across the carpet as a crunching feeling and sound as each foot is placed upon the carpet. This may be alleviated by using less adhesive. However, that may lead to a failure during the delamination test or the tuft binding test.

Applicant has found that some adhesives perform better than other adhesives when applied at the same rate to the primary backing. That is to say that a first adhesive may be applied at a first rate onto the primary backing to pass the delamination test and the tuft binding test. However, a second adhesive may have to be applied at a greater rate to similarly pass the tests.

Applicant has found that the adhesives that require a lower rate of application are those with higher viscosities. In one embodiment, it may be said that a hot melt adhesive with a higher melt viscosity will require a lower application rate to pass the delamination and tuft binding tests than an adhesive with a lower melt viscosity. In other embodiments, hot melt adhesives with higher shear viscosities will require a lower application rate to pass the delamination and tuft binding tests than an adhesive with a lower shear viscosity. The viscosity and other rheological properties of molten polymers, including hot melt adhesives, may be found through testing under the ASTM D4440-15 standard.

The characteristics of the strands of filament developed in the cob-webbing application are dependent upon the melt viscosity of the hot melt adhesive polymer. A hot melt adhesive polymer with a higher melt viscosity will tend to be less flexible than a hot melt adhesive polymer with a lower melt viscosity. In one way, the less flexible strands will not conform to the irregular surface of the back of the primary backing as well as the more flexible strands. That is to say that a more flexible strand will drape over the backstitching and into the crevasses between the backstitching to lay onto the primary backing. In this situation, the strands of the hot melt adhesive that are draped along the sides of the backstitching will not contribute to the strength of the adhesion since they will not be contacted to the secondary backing. Essentially, portions of the strands of a lower melt viscosity adhesive will be at such an angle, perhaps even perpendicular, to the primary backing that the adhesive will not be contacted by the secondary backing to provide any adhesion.

In accordance with U.S. Pat. No. 11,084,267, a fiber binder applies heat to the back of the primary backing such that at least a portion of the backstitching is melted and fused to the primary backing. It may be conjectured that the fiber binder is smoothing the surface of the tufted primary backing so that the strands of the hot melt adhesive will be able to lay across the primary backing more flatly to contact more of the secondary backing. That is to say that the tops of the backstitching will have a lower distance above the surface of the primary backing after having been through a fiber binder than if they had not. This may allow more of the adhesive applied to the surface of the primary backing over the backstitching to contact and provide adhesion to the secondary backing.

Another way of describing this is to say that melting the backstitching so that at least a portion of the backstitching infuses into and with the primary backing will produce a surface that has lower protrusions from the backstitching; ridges at a lower height above the surface of the primary backing. This exposes more of the strands of the hot melt adhesive to the secondary backing as it is mated to the primary backing. If the surface of the primary backing still had higher ridges formed by the backstitching, some portion of the adhesive will fall between the ridges at such an angle that it will not contact the secondary backing. This reduces the effective bond strength between the primary and secondary backings. Also, in this, fusing the backstitching to the primary backing will greatly increase the tuft binding. This may allow more of the adhesive to be used for lamination strength.

On the other hand, strands of molten adhesive applied through cob-webbing may or may not fall into and contact the bottoms of the crevasses formed by the ridges formed from the fibers of the backstitching. In some instances, when the strand is very flexible, it will fall into a crevasse between adjacent ridges. It may sag and align itself with the sides of the yarn of the backstitching. As noted, this may not provide enough of the adhesive to contact and adhere to the secondary backing when mated.

However, if conditions are changed to decrease the flexibility of the strand, the strand may not sag or extend to conform to the profile of the ridges and crevasses formed by the backstitching. While this may keep much of the adhesive at the surface of the back of the primary backing, it may not provide any adhesion strength if it does not contact and become enmeshed within both the secondary backing and the primary backing. That is to say that if the pressure of the nip roller does not exert enough force to press the adhesive into the primary and secondary backings, the adhesive may not provide any adhesion at those areas.

SUMMARY OF THE INVENTION

In one embodiment, applicant has devised a method to produce a laminated textile product using cob-webbing of a hot melt adhesive wherein before the primary sheet is contacted with the secondary sheet cob-webbing of the adhesive between either the primary or the secondary backing and the applicator is induced. In this, the strands of the adhesive lay upon the entirety of the irregular surface of either the primary or the secondary backing and provide adhesion to all contacted surfaces of the backings.

In some embodiments, a nip roller may exert a force between the primary and secondary backings to force the molten polymer adhesive into the yarn of the backstitching, into the primary backing, and into the secondary backing. The adhesive pressed into all of these areas will form a higher resistance to delamination and tuft pull than an adhesive that is not contacting and adhering to all of those components.

In another embodiment, controlling the viscosity of the hot melt polymer adhesive allows strands of cob-webbing adhesive to achieve a desired flexibility as the adhesive is applied.

In one embodiment, if the cob-webbing strands of a hot melt polymer adhesive are too flexible when applied at a certain rate, the adhesive strength may not be sufficient to pass the delamination and tuft binding tests. To offset this, the hot melt polymer adhesive may be applied at a cooler temperature where the viscosity of the hot melt polymer adhesive is raised. In doing so, the strands may not be so flexible that they do not contribute to the overall adhesion of the backings.

If it is not feasible to cool the temperature of the hot melt polymer adhesive, then the hot melt polymer adhesive may be mixed with a component or components that will increase the viscosity of the adhesive. In doing so, a lower rate of application of the hot melt polymer adhesive may be applied where the strands will not be so flexible that they do not contribute to the overall adhesion of the backings.

In another embodiment, adjustments may be made to the viscosity of the hot melt polymer adhesive to obtain a desired strand flexibility, where the adhesive is applied to the secondary backing before mating it to the primary backing.

When the viscosity of a polymer is increased, a strand of it will become less flexible. It will still extend and lay upon a surface when used with an applicator that induces cob-webbing. However, it will not entirely conform to the features of the surface to which is applied. That is to say that it will not sag into the crevasses formed between ridges of backstitches. When the backings are then mated, some portion of the adhesive will contact the secondary backing and be driven to contact some portion of the yarn in the backstitching and/or the primary backing. In the embodiments where the backings and the yarn are porous, some amount of the adhesive will be driven into the pores and interstitial spaces where it will cure and add more strength against delamination and tuft pull.

The effect of better adhesion from a less flexible strand is amplified when myriad strands are in close proximity as are deliverable from cob-webbing from the applicator.

In another embodiment, the adhesive may be transferred to a surface of the secondary backing at an amount of between 5% and 20% less than what would be applied to the primary backing. That is to say that if an adhesive is used that provides adequate adhesion between the primary and secondary backings at a rate of between 100 and 600 g/m$^2$, then in an optimal embodiment, a rate of between 80 and 480 g/m$^2$ may only be needed for an embodiment using the teachings and inventions disclosed herein.

The adhesives that may be used with the inventions taught and disclosed herein may be of any form or type that exhibits the characteristic of forming cob-webbing as it is applied. In a preferred embodiment, the adhesive may be a polymer comprised predominantly or entirely of PET. In another preferred embodiment, the adhesive may be a polymer comprised predominantly or entirely of PET and coPET. In another preferred embodiment, the adhesive may be a polymer comprised of PET, coPET, and other monomers that reduce the melt point of the polymer compared to a polymer of just PET and coPET. The polymer in the adhesive may be crystalline, semi-crystalline, or amorphous.

In yet again another embodiment the temperature of the polymer adhesive at the contact site may be between 180° C. and 190° C. In some embodiments, the polymer adhesive may be heated above that range before it is moved to the applicator. That is to say that in a holding area, the temperature of the molten adhesive may be higher than its temperature at the application site. In some embodiments, this may be because the application site is exposed to ambient conditions such as a plant factory floor where the air has the capacity to quickly remove heat from the molten adhesive. This may be from factors such as the temperature of the air, the relative humidity of the air, and/or the mass flow of air contacting the molten adhesive proximal the contact site.

In one embodiment, the transport speed of the backing with respect to a roller-style applicator may be around 4 m/min. In a preferred embodiment the transport speed of the backing with respect to a roller-style applicator may be at least 10 m/min.

In a preferred embodiment, a hot melt adhesive may be applied to the back of a primary backing from a roller while an air knife blows a gas into the gap between the roller and the primary backing. The action of the gas jetted from the air knife will not allow cob-webbing, but instead further presses the adhesive into the recesses and crevasses of the backstitching and the primary backing. Along with this, the temperature of the gas blown from the air knife may be controlled such that the gas continues to provide heat to the applied molten adhesive for a time after it leaves the roller. In a preferred embodiment, the gas may be air.

Descriptions of these inventions will be defined in the appended independent claims, while preferred embodiments are defined in the dependent claims.

In a first embodiment, the invention is a laminated textile product, comprising: a tufted primary backing having a first side and a second side; wherein the first side of the primary backing comprises loops of yarn and the second side of the primary backing comprises a backstitching of the loops of yarn; a secondary backing having a first side and a second side; a glue layer comprising a hot melt polymer adhesive adhering the second side of the primary backing to the first side of the secondary backing; and wherein the laminated textile product is a carpet tile.

In a second embodiment, the invention is a method of making a laminated textile product, comprising: providing a primary backing, wherein the primary backing has a first side comprising loops of yarn and a second side comprising backstitching; providing a secondary backing; providing a polymer hot melt adhesive; providing an applicator, wherein the applicator is configured to apply the hot melt adhesive; advancing the secondary backing across the applicator such that the applicator applies the hot melt adhesive to a first side of the secondary backing to induce cob-webbing between the applicator and the first side of the secondary backing; contacting the first side of the secondary backing with the second side of the primary backing after the cob-webbing strands of the hot melt adhesive have snapped; and cutting the laminated textile product into at least one carpet tile.

In a third embodiment, the invention is a method of increasing an adhesion strength of a hot melt adhesive in a laminated textile product, comprising: providing a primary backing, wherein the primary backing has a first side comprising loops of yarn and a second side comprising backstitching; providing a secondary backing; providing a polymer hot melt adhesive; providing an applicator, wherein the applicator is configured to apply the polymer hot melt adhesive; advancing the primary backing across the applicator such that the applicator applies the polymer hot melt adhesive to the second side of the primary backing to induce cob-webbing between the applicator and the first side of the secondary backing; contacting the first side of the secondary backing with the second side of the primary backing after the cob-webbing strands of the polymer hot melt adhesive have snapped; increasing the viscosity of the polymer hot melt adhesive; and wherein the laminated textile product is a carpet tile.

In a fourth embodiment, the invention is a method of making a laminated textile product, comprising: providing a primary backing, wherein the primary backing has a first side comprising loops of yarn and a second side comprising backstitching of the yarn; providing a secondary backing; providing a hot melt adhesive; providing an applicator, wherein the applicator is configured to apply the hot melt adhesive; advancing the primary backing across the applicator such that the applicator applies the hot melt adhesive to the second side of the primary backing; blowing a gas onto the primary backing between the applicator and the second side of the primary backing; contacting a first side of the secondary backing with the second side of the primary backing.

In a fifth embodiment, the invention is a method of making a laminated textile product, comprising: providing a primary backing, wherein the primary backing has a first side and a second side; providing a secondary backing; providing a hot melt adhesive; providing an applicator, wherein the applicator has a width and is configured to apply the hot melt adhesive across at least a portion of the width; advancing the primary backing across the applicator such that the applicator applies the hot melt adhesive to the second side of the primary backing across at least the portion of the width; providing an air knife along at least the portion of the width of the applicator; jetting a gas from the air knife onto the primary backing between the applicator and the second side of the primary backing; contacting a first side of the secondary backing with the second side of the primary backing to form the laminated textile product; and cutting the laminated textile product into at least one carpet tile.

BRIEF DESCRIPTION OF THE DRAWINGS

With the intention of better showing the characteristics of the invention, herein after, as an example without any limitative character, some preferred embodiments are described, with reference to the accompanying drawings, wherein.

DETAILED DESCRIPTION

Figure 1A:
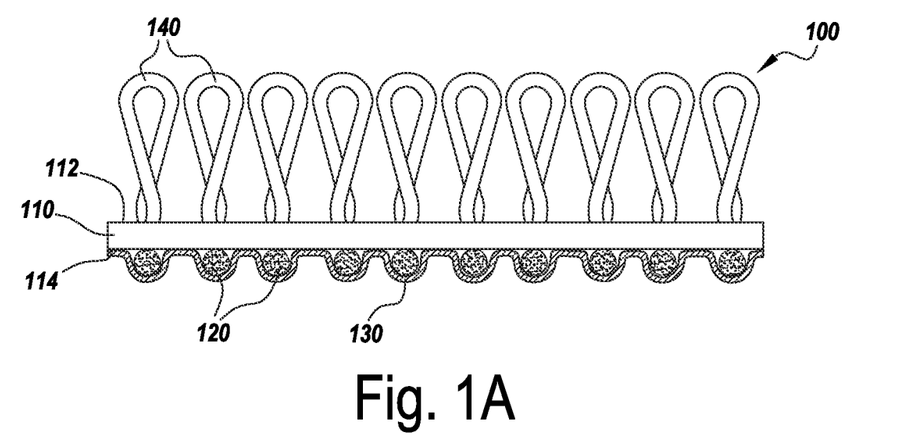
FIGS. 1A and 1B illustrate hot melt adhesive strands on yarn backstitching.

FIG. 1A illustrates a tufted primary backing 110 with its associated backstitching 120. The illustration shows a highly flexible strand 130 of polymer adhesive conforming to the characteristics of the back surface 114 of the primary backing 110. That is to say that the strand 130 has sagged into the crevasses between the ridges formed by the yarn backstitching 120. In this illustration, the loops 140 extend away from the front surface 112 of the primary backing 110.

It may be known to those of skill in the art that the term sagging in this exemplary illustration is not dependent upon gravity. Instead, the strand 130 will conform to the surfaces it encounters as it lays onto them. This being due to the low viscosity of the strand 130 and its cohesive properties.

When the strand 130 has mass that is not positioned to contribute to the adhesion, mating the primary backing 110 to a secondary backing will not utilize all of the adhesive to secure the primary sheet 110 with the secondary sheet. Instead, some portions of the adhesive will simply stay between the yarn and not contribute to the adhesion between the backing or to binding the tufts.

Figure 1B:
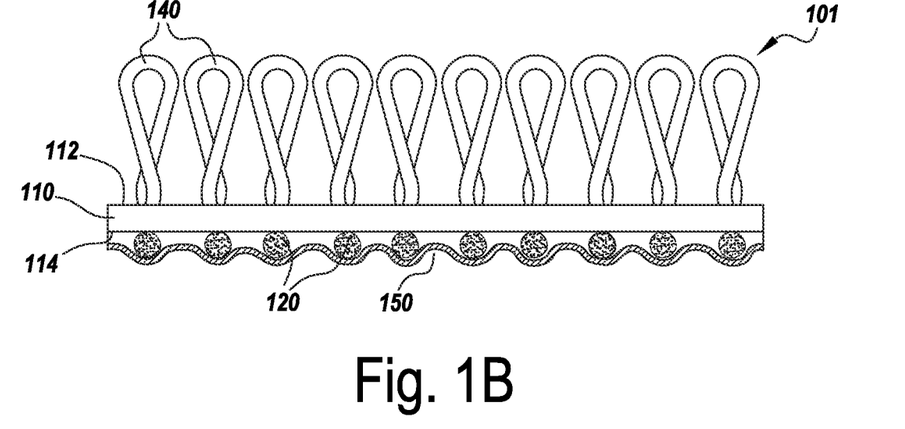

FIG. 1B also illustrates a tufted primary backing 110 with its associated backstitching 120. The illustration shows a less flexible strand 150 of polymer adhesive laying atop the characteristics of the primary backing 110 and backstitching 120. That is to say that the strand 150 has not sagged into the crevasses between the ridges formed by the yarn backstitching.

Mating the primary backing 110 to a secondary backing will utilize all of the adhesive to secure the primary sheet 110 with the secondary sheet. A force applied after mating the backings will force all parts of the adhesive to contact the primary backing 110, the secondary backing, and the portions of the yarn that will be in contact with the secondary backing. Preferably, this will also force the adhesive to infuse into the pores and interstitial spaces near the surfaces of those components as well.

In both FIGS. 1A and 1B, the relative sizes of the strands may not be illustrated to scale with the other components but are enlarged to illustrate the concepts disclosed herein.

Figure 2:
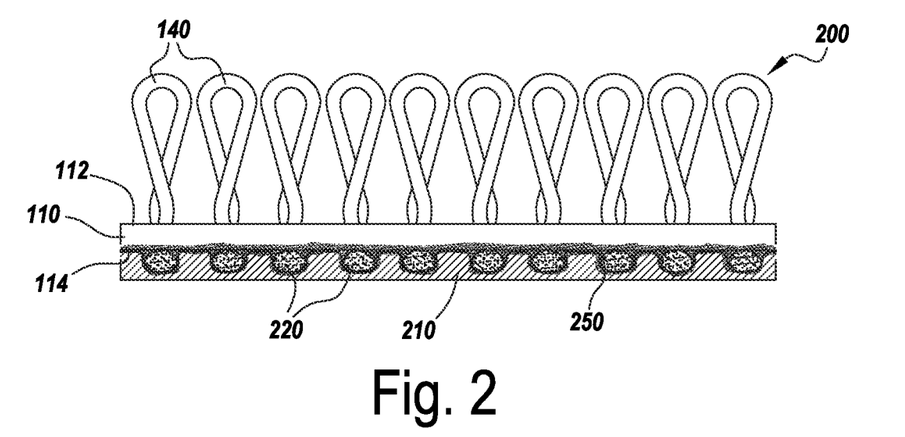
FIG. 2 illustrates a cross section of a textile product manufactured according to the invention.

FIG. 2 illustrates the respective layers of an embodiment of a laminated textile product 200 manufactured according to the inventions taught and disclosed herein. The carpet tile comprises a primary backing 110, which may be a woven sheet, which has been tufted. The yarns 140 extend from the first surface 112 of this first sheet and are secured to the second surface 114 of the sheet. The weight of this primary sheet is typically about 135-153 $g/m^2$ (not including the tufted yarns). To provide sufficient mechanical stability for use as an end product such as a carpet or carpet tile, the product 200 comprises a secondary backing sheet 210, which may be a needled felt backing. The weight of this secondary sheet may be about 300-500 $g/m^2$, with a preferred embodiment of about 340 $g/m^2$. The first and second backing layers are laminated together using a polymer adhesive, which may be a hot melt adhesive applied as layer 250 at a weight of about 170 $g/m^2$. In this figure, the adhesive layer 250 is illustrated as fused into the primary backing 110, the secondary backing 210, and into the backstitching 220.

In this illustrative embodiment, the backstitches 220 have been compressed between the primary backing 110 and the secondary backing 210. Some of the adhesive 250 will be absorbed into the pores and interstitial spaces within the primary backing 110, the secondary backing 210, and the backstitches 220.

In a preferred embodiment, the primary backing 110, the secondary backing 210, the yarn, and the adhesive layer 250 may all be comprised of polyester. In that case, the entire laminated textile product 200 may be recyclable into new polyester products.

Figure 3:
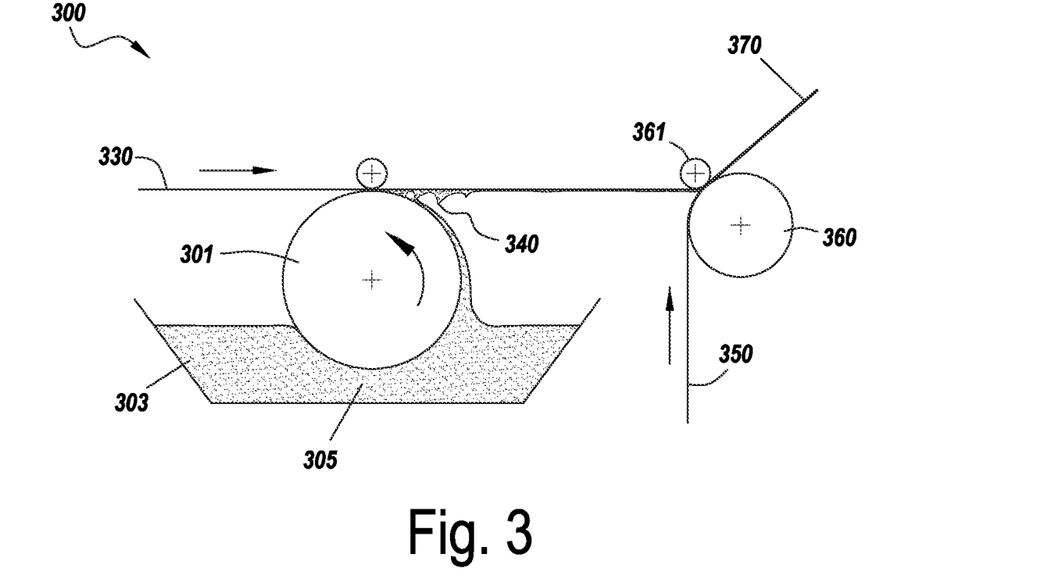
FIG. 3 illustrates the principle of a coating process using a lick roller applicator.

FIG. 3 illustrates the principle of applying the molten hot melt polymer adhesive using a lick roller 301 as an applicator. In this illustrative embodiment the lick roller 301 comprises a metal drum that turns into a trough 303 of molten polymer adhesive 305, by which a layer of adhesive is formed on the outer circumference of the lick roller 301. The adhesive is transported towards the back of the primary backing 330 to be coated with a thin layer of the adhesive where cob-webbing 340 forms between the lick roller 301 and the primary backing 330.

The primary backing sheet 330 is transported across the top of the turning lick roller 301. As the upper side of the turning lick roller 301 contacts the roller at a contacting site where the cob-webbing 340 forms. In a preferred embodiment, the lick roller 301 turns towards the source of the primary backing 330 being fed. This motion contributes towards a scraping effect allowing the primary backing 330 to scrape the molten adhesive 305 from the lick roller 301 as it is transported.

The speed with which the substrate is introduced, the speed of the lick roller 301, their mutual contact pressure and surface area, and the viscosity of the compounds determine the final coating weight. This weight may vary between 20 and 1200 g/m$^2$. The lick roller 301 may have a width of up to about 4.20 meters such that common broadloom carpets may be made using this coating method.

After the molten adhesive 305 has been applied with cob-webbing 340, a secondary backing 350 may be laminated to the primary backing 330 as illustrated as the sheets pass between laminating rollers 360, 361. The laminating rollers 360, 361 may act as a nip roller to press the backings together. The bound sheets comprise the laminated textile product 370, which may be delivered as a broadloom carpet, or cut into carpet tiles.

At the site of the cob-webbing 340, the primary backing 330 is moving away from the lick roller 301 with some of the adhesive 305 adhering to it. As the primary backing moves further away from the lick roller 301, the strands stretch and break from the lick roller 301. Once they break from the roller 301, they will lay onto the primary backing 330 to form a texture of fine strands. Advancing the primary backing 330 across the lick roller 301 at speed of about 10 m/min, the strands will typically have a thickness of about 20 μm, and a length at break of about 10-15 cm.

As disclosed herein, an alternative embodiment may be to advance the secondary backing across the applicator so that the molten adhesive is laid onto the secondary backing with cob-webbing. After that, the secondary backing may be mated to the primary backing in much the same way as illustrated in FIG. 3. By applying the molten adhesive to the secondary backing, all of the mass of the adhesive will contribute towards the adhesion between the primary and secondary backing.

Also, some of the adhesive will bind the backstitches to the secondary backing so that the bind between the backstitches and the secondary backing, along with any adhesive that seeps into the primary backing and the backstitches, will contribute towards binding the tufts in place. In some places, the adhesive will be infused into the primary backing, the secondary backing, and the backstitching to contribute towards the lamination and tuft binding strengths.

If the molten adhesive 305 is applied to the primary backing 330 as illustrated in FIG. 3 through cob-webbing 340, but the end product 370 fails a delamination test or a tuft bind test, then the strands of the molten polymer adhesive may be too flexible such that they conform to the crevasses and ridges made by the backstitching on the bottom surface of the primary backing 330, as is illustrated in FIG. 1A. As disclosed herein, this may be addressed by increasing the viscosity of the molten adhesive to stiffen the strands. When that happens, the strands will not fully conform to the topology of the back of the primary backing, but will lay across the tops of the ridges formed by the backstitching so that all of the mass of the polymer adhesive will contribute to the adhesion as illustrated in FIG. 1B.

One method of improving the viscosity of the hot melt adhesive is to react the polymers with a chain extender to increase the average molecular weight of the adhesive. Additionally, the viscosity of the hot melt adhesive may be improved with antioxidants and stabilizers.

One way to prepare a molten hot melt polymer adhesive is to take pellets of the adhesive and pass them through an extruder, which grinds them together and compresses them so that the pellets become molten from the friction developed within the extruder. The molten adhesive may then be transported to an applicator, such as the trough in a lick roller applicator, or as the puddle in the application and dosing rollers applicator. As the pellets are added to an extruder, antioxidants and stabilizers may be added with them at a rate sufficient to increase the viscosity such that less flexible strands of the adhesive are formed during cob-webbing.

Another way to prepare molten hot melt polymer adhesive is to take an existing fluid of the adhesive and bring it to a temperature sufficient for delivering to an applicator. In this, antioxidants and stabilizers may be added with the polymer fluid at a rate sufficient to form less flexible strands of the adhesive from cob-webbing. The determination of the weight-average molecular weight of polymers may be found by testing with the ASTM D4001-20 standard.

Those of skill in the art will also know of ways to react the polymer adhesive with a chain extender to increase the average molecular weight of the adhesive. In one embodiment, the pellets of polymer adhesive may be prepared in advance so that long-chain polymers of adhesive will be ready for use in pellet form so it may be extruded with or without antioxidants and stabilizers onto a primary or secondary backing.

In some embodiments, a seed batch of the polymer adhesive may be reacted with a chain extender and produced as pellets and set aside. Then, when a production run is started, the seed batch of pellet may be metered into an extruder along with unreacted adhesive pellets. In this way, only a portion of the adhesive has been reacted with the chain extender but the overall molten adhesive will have a higher viscosity than a molten adhesive prepared without any of the seed batch. In this embodiment, only a portion of the chain extended adhesive need be mixed with the adhesive that has not been reacted with a chain extender to sufficiently raise the viscosity of the overall molten adhesive to achieve acceptable results for lamination and tuft bind strengths.

In other embodiments, a polymer that is different from the polymer adhesive may be added to the polymer adhesive to increase the viscosity of the polymer adhesive. That is to say that the viscosity of the molten polymer adhesive may be increased by adding a long chain polymer to it, even if the long chain polymer does not contribute to the lamination or tuft bind strength.

In some embodiments, the secondary backing 350 may be a needled felt product. In those embodiments, the needled felt product may have ridges and crevasses similar to those presented by the backstitching of the primary backing 330. In those embodiments, the strands of molten polymer adhesive may conform to the topology of the secondary backing 350 such that some portions of the mass of adhesive 305 may not fully contribute towards the adhesion between the backings. Rather than adding more adhesive so that the end product 370 passes a delamination test and a tuft binding test, the flexibility of the strands may be reduced by increasing the viscosity of the molten polymer as disclosed and taught herein.

Figure 4:
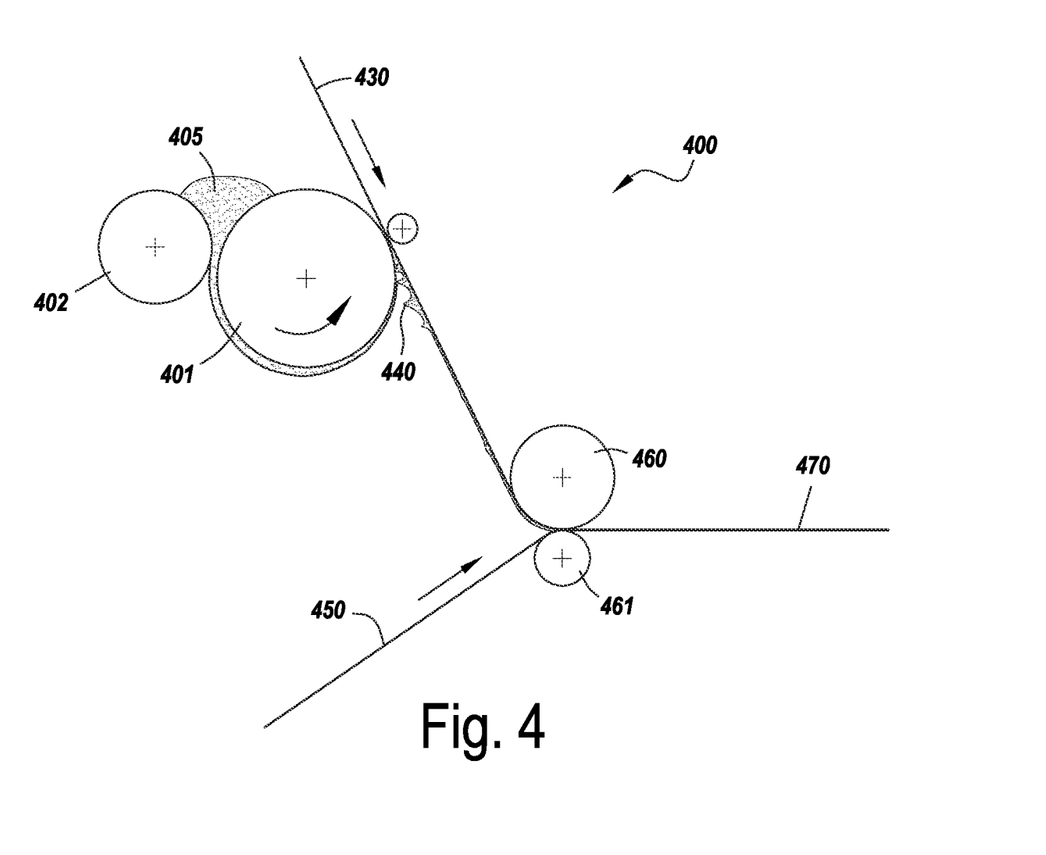
FIG. 4 illustrates a laminating process incorporating cob-webbing.

FIG. 4 illustrates another embodiment for applying molten polymer adhesive with cob-webbing. In this embodiment, a puddle of molten adhesive 405 sits between an application roller 401 and a dosing roller 402. A gap between the application roller 401 and the dosing roller 402 may be narrowed or widened to allow less or more adhesive to carry through to be applied to the back of the primary backing 430. After the primary backing 430 contacts the application roller 401, cob-webbing 440 occurs which applies the strands of adhesive 405 to the primary backing 430. After the adhesive 405 is laid onto the primary backing 430, the primary backing 430 and the secondary backing 450 are mated and secured together with laminating rollers 460, 461 to produce a laminated textile product 470.

As disclosed herein, an alternative embodiment may be to advance the secondary backing across the applicator so that the molten adhesive is laid onto the secondary backing with cob-webbing. After that, the secondary backing may be mated to the primary backing in much the same way as illustrated in FIG. 4. By applying the molten adhesive to the secondary backing, all of the mass of the adhesive will contribute towards the adhesion between the primary and secondary backing.

Also, if the molten adhesive 405 is applied to the primary backing 430 as illustrated in FIG. 4 through cob-webbing 440, but the end product 470 fails either a delamination test or a tuft binding test, then the strands of the molten polymer adhesive may be too flexible in that they conform to the crevasses and ridges made by the backstitching on the bottom surface of the primary backing 430, as is illustrated in FIG. 1A. As disclosed herein, this may be addressed by increasing the viscosity of the molten adhesive to stiffen the strands. When that happens, the strands will not fully conform to the topology of the back of the primary backing, but will lay across the tops of the ridges formed by the backstitching so that all of the mass of the polymer adhesive will contribute to the adhesion such as is illustrated in FIG. 1B.

The secondary backing 450 may be a needled felt product. In that case, it may have ridges and crevasses similar to those presented by the backstitching of the primary backing 430. Again, if the end product 470 fails a delamination test or a tuft binding test, rather than adding more adhesive 405 to the backing, the adhesion between the primary backing 430 and the secondary backing 450 may be improved by changing the viscosity of the adhesive 405 so that the strands of molten polymer become more rigid.

In all of the embodiments disclosed and taught herein, the laminated textile product may be recyclable. The yarn, the primary and secondary backings, and the adhesive may be made of a recyclable polymer. That is to say that the adhesive may be made of a recyclable polyester polymer such as, but not limited to, PET and/or PET and coPET.

Figure 5:
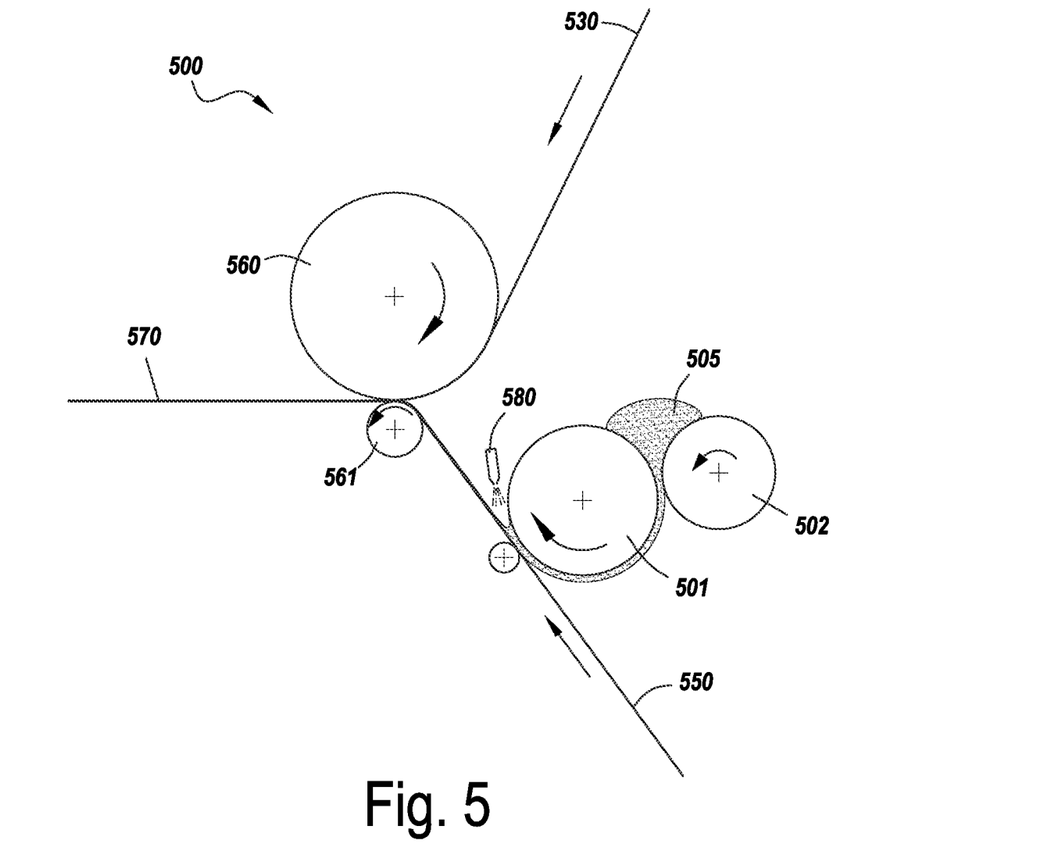
FIG. 5 illustrates a laminating process incorporating an air knife.

Turning now to a more preferred embodiment, an embodiment of the use of an air knife to seat the hot melt adhesive is illustrated in FIG. 5. In this illustrative embodiment, an air knife 580 is positioned near to the primary backing 550 after adhesive is applied from the laminating roller 501.

An air knife, which may also be known to those skilled in the art as an air blade, may be configured to extend across the width of the laminating apparatus 500 such that the entirety of the area of contact between the primary backing 550 and the application roller 501 is impacted by the air being jetted from the air knife.

As is similar to the process 400 of the embodiment of FIG. 4, the primary backing 550 may be drawn across the application roller 501 to transfer adhesive 505 to the back of the primary backing 550. The amount of adhesive 505 may be configured by adjusting the gap between the application roller 501 and the dosing roller 502.

Positioned just after the adhesive is transferred is an air knife 580 configured to blow a gas, such as air, across the width of the primary backing 550. The air being blown from the air knife 580 may be directed into the space between the primary backing 550 and the application roller 501. The force of the air may be such that no cob-webbing strands are formed between the primary backing 550 and the application roller 501. Instead, the air will push the transferred adhesive 505 deeper into the crevasses and ridges of the backstitching and into the pores and interstitial spaces of the yarn and primary backing 550 where it will eventually cure and add more strength against delamination and tuft pull.

In a first embodiment, the air knife 580 may be configured to continually expel a sufficient volume of gas across the width of the laminating apparatus 500 to prevent cob-webbing. In another embodiment, the air knife 580 may be configured to continually expel a sufficient volume of gas across the width of the laminating apparatus 500 to prevent cob-webbing and to press the molten adhesive 505 into the pores and interstitial spaces of the yarn and primary backing 550.

In a preferred embodiment, the gas may be air. Air may be compressed near the laminating apparatus 500 and driven immediately through the air knife 580. In other embodiments, the gas may be from cylinders and may be configured with inert and/or reactive gases. In this, it may be preferable to use a reactive gas to react with a component to provide a desired property. For example, the gas may be a composition of nitrogen and chlorine. The amount of chlorine in the nitrogen may be configured to react with a portion of the adhesive, the yarn, the primary backing, or combinations thereof. In another embodiment, the gas may be entirely inert. For example, the gas may be composed of nitrogen or carbon dioxide to prevent the molten adhesive 505 from being oxidized.

The gas from the air knife 580 need not only apply pressure to drive the adhesive 505 into the crevasses and ridges of the backstitching and into the pores and interstitial spaces of the yarn and primary backing 550, but may also be configured with other environmental properties. For example, the gas may be configured with a temperature and/or with a humidity.

A humidity configured within the gas may add or remove moisture from the adhesive spread across the back of the primary backing. Blowing arid air across the adhesive 505 would remove and/or eliminate any moisture that may condense upon the adhesive 505 before it is mated and secured together with the secondary backing 530 between the laminating rollers 560, 561. In a preferred embodiment, the humidity configured in the gas may be held constant throughout the running of the laminating apparatus 500. For example, when the ambient air has a high relative humidity, the air from the air knife 580 may be arid to offset that. However, when the ambient air has a low relative humidity, the air from the air knife 580 may be set to blow in air with a higher relative humidity. In this way, the relative humidity of the air contacting the adhesive 505 from the time that it is applied onto the primary backing 550 from the application roller 501 until it is mated and secured to the secondary backing 530 between the laminating rollers 560, 561 will remain constant regardless of any ambient changes outside of this space.

The gas may also be configured with a temperature. In a first aspect, the temperature of the gas may counteract seasonal and/or daily variations in ambient conditions. For example, the facility housing the laminating apparatus 500 may be warmer in the summer and colder in the winter. Similarly, it may be cooler in the morning and hotter in the afternoons. Regulating the temperature of the gas from the air knife 580 can offset these inconsistencies to make the laminated textile product 570 have consistent tuft bind and delamination strength throughout any ambient condition changes.

In a second aspect, configuring the temperature of the gas may provide additional heat to the adhesive 505 after it leaves the application roller 501 until the time that the primary backing 550 is mated and secured to the secondary backing 530 between the laminating rollers 560, 561. In the time that the adhesive 505 leaves the application roller 501 until the time that the primary backing 550 is mated and secured to the secondary backing 530 between the laminating rollers 560, 561, the adhesive is cooling. Having the temperature controlled air remain in contact with the adhesive in the section between when the adhesive 505 is applied by the application roller 501 until the time that the primary backing 550 is mated and secured to the secondary backing 530 between the laminating rollers 560, 561 may be done by positioning a baffle or a diverter within the laminating apparatus 500 such that the gas that has been blown by the air knife 580 to prevent the formation of cob-webbing strands and to press the molten adhesive 505 into the pores and interstitial spaces of the yarn and primary backing 550 may then be directed towards the section of the apparatus 500 between when the adhesive 505 is applied by the application roller 501 until the time that the primary backing 550 is mated and secured to the secondary backing 530 between the laminating rollers 560, 561.

In another embodiment, the temperature of the gas from the air knife 580 may be higher than the temperature of the molten adhesive 505. This may be done to prevent degradation of the molten adhesive before it is applied through contact with the primary backing 550, but is then heated by the gas from the air knife 580 to a temperature that will provide desirable bonding and binding properties.

The temperature-controlled gas need not just dissipate after being applied to eliminate the cob-webbing strands or after being applied to the section of the apparatus 500 between when the adhesive 505 is applied by the application roller 501 until the time that the primary backing 550 is mated and secured to the secondary backing 530 between the laminating rollers 560, 561. Instead, the temperature-controlled gas may be further directed after it has achieved one or both of those objectives. In another embodiment, additional conduits maybe installed such that the temperature-controlled gas may be directed to flow around the laminated textile product 570. This may be to heat or cool the laminated textile product 570 at a slower or faster rate than would be achieved by only exposing the laminated textile product 570 to ambient air after it has been mated and secured together by the laminating rollers 560, 561. In one aspect, this may be used to anneal the adhesive so that it does not cool too quickly which may make the adhesive brittle within the laminated textile product.

In an envisioned embodiment, the air knife is not limited to blowing only gas. In this embodiment, particulate matter may be entrained in the gas to be delivered onto the adhesive 505 while it is still hot. With enough force from the jetted gas, the particulate matter may be deeply embedded into the adhesive 505. This may be useful to deliver a filler such as, but not limited to: glass, sand, and calcium carbonate. The jetted particulate matter may also be useful in preventing cob-webbing in that the particles may sever the strands and thus prevent the formation of the strands while less pressure is used to drive the gas from the air knife.

The present invention is in no way limited to the herein above-described embodiments. On the contrary many such improvements to application of adhesives may be devised and applied according to various variations of the inventions disclosed and taught herein, without leaving the scope of the present invention.

The invention claimed is:

1. A method of making a laminated textile product, comprising:
   providing a primary backing, wherein the primary backing has a first side comprising loops of yarn and a second side comprising backstitching of the yarn;
   providing a secondary backing;
   providing a hot melt adhesive;
   providing an applicator, wherein the applicator is configured to apply the hot melt adhesive;
   advancing the primary backing across the applicator such that the applicator applies the hot melt adhesive to the second side of the primary backing;
   blowing a gas onto the primary backing between the applicator and the second side of the primary backing;
   contacting a first side of the secondary backing with the second side of the primary backing.

2. The method of making a laminated textile product of claim 1, wherein the step of blowing a gas onto the primary backing between the applicator and the second side of the primary backing prevents cob-webbing.

3. The method of making a laminated textile product of claim 2, wherein the gas is blown onto the primary backing through an air knife.

4. The method of making a laminated textile product of claim 3, wherein the gas is configured with a temperature, a humidity, or a combination thereof.

5. The method of making a laminated textile product of claim 4, wherein the gas is comprised of an inert gas, a reactive gas, or a combination thereof.

6. The method of making a laminated textile product of claim 5, wherein the gas is air.

7. The method of making a laminated textile product of claim 1, wherein the hot melt adhesive comprises a polymer.

8. The method of making a laminated textile product of claim 7, wherein the polymer in the hot melt adhesive is crystalline, semi-crystalline, or amorphous.

9. The method of making a laminated textile product of claim 7, wherein the polymer in the polymer hot melt adhesive comprises PET or PET and coPET.

10. A laminated textile product made from the method of claim 9, wherein the laminated textile product is entirely recyclable.

11. The method of making a laminated textile product of claim 7, further comprising the step of reacting the polymer with a chain extender and/or adding antioxidants and stabilizers to the hot melt adhesive.

12. The method of making a laminated textile product of claim 1, wherein the applicator is chosen from the group consisting of a lick roller, a kiss roller, and an application roller with a dosing roller.

13. The method of making a laminated textile product of claim 1, further comprising the step of passing the contacted primary and secondary backings through a nip roller.

14. A method of making a laminated textile product, comprising:
- providing a primary backing, wherein the primary backing has a first side comprising loops of yarn and a second side comprising backstitching of the yarn;
- providing a secondary backing;
- providing a hot melt adhesive;
- providing an applicator, wherein the applicator has a width and is configured to apply the hot melt adhesive across at least a portion of the width;
- advancing the primary backing across the applicator such that the applicator applies the hot melt adhesive to the second side of the primary backing across at least the portion of the width;
- providing an air knife along at least the portion of the width of the applicator;
- jetting a gas from the air knife onto the primary backing between the applicator and the second side of the primary backing; and
- contacting a first side of the secondary backing with the second side of the primary backing to form the laminated textile product.

15. The method of making a laminated textile product of claim 14, wherein the step of jetting a gas onto the primary backing between the applicator and the second side of the primary backing prevents cob-webbing.

16. The method of making a laminated textile product of claim 15, wherein the hot melt adhesive comprises a polymer.

17. The method of making a laminated textile product of claim 16, wherein the polymer in the polymer hot melt adhesive comprises PET or PET and coPET.

18. The method of making a laminated textile product of claim 14, wherein the applicator is chosen from the group consisting of a lick roller, a kiss roller, and an application roller with a dosing roller.

19. The method of making a laminated textile product of claim 14, wherein the gas is configured with a temperature, a humidity, or a combination thereof.

20. The method of making a laminated textile product of claim 19, wherein the gas is air.

* * * * *